United States Patent Office 3,256,353
Patented June 14, 1966

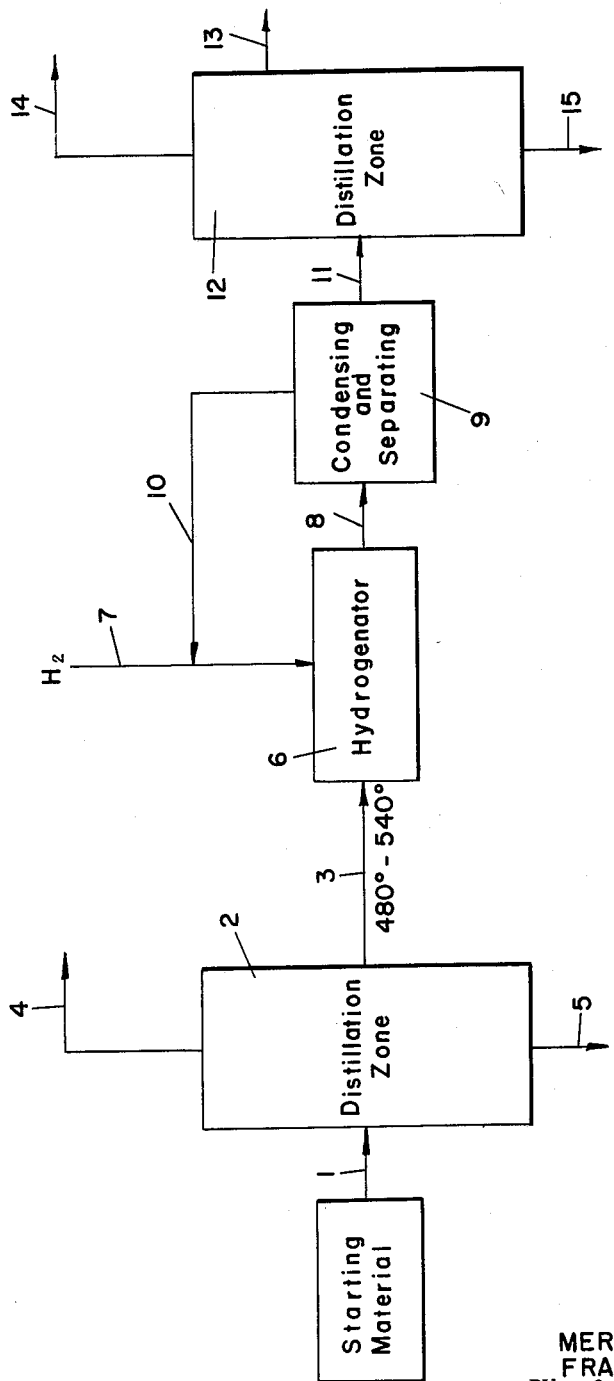

3,256,353
PREPARATION OF DIMETHYLDECALINS
Frank R. Shuman, Jr., Media, Pa., and Merritt C. Kirk, Jr., Claymont Heights, Claymont, Del., assignors to Sun Oil Company, Philadelphia, Pa., a corporation of New Jersey
Filed Sept. 20, 1962, Ser. No. 225,034
10 Claims. (Cl. 260—667)

This invention relates to the preparation of dimethyldecalins (dimethyldecahydronaphthalenes). The invention also includes the isomerization of a mixture of dimethyldecalin isomers to 2,6-dimethyldecalin.

2,6-naphthalenedicarboxylic acid is a highly desirable article of commerce in that it can be used for making polyester type resins which have outstandingly good properties for certain applications. This acid can be prepared by the catalytic oxidation of 2,6-dimehtylnaphthalene.

A difficulty in the commercial prepartion of 2,6-naphthalenedicarboxylic acid lies in finding a suitable source of 2,6-dimethylnaphthalene. Various petroleum fractions are known to contain 2,6-dimethylnaphthalene and other dimethylnaphthalene isomers, but for several reasons these petroleum fractions have not been a commercially satisfactory source of 2,6-dimethylnaphthalene. One reason is that it is extremely difficult to separate the 2,6-dimethylnaphthalene, either alone or in admixture with other dimethylnaphthalene isomers, from the great variety of other compounds also present in these petroleum fractions. This problem will be more fully discussed hereinafter. A second reason is that even if it were possible to separate a mixture of dimethylnaphthalene isomers from petroleum, the amount of the 2,6-isomer is low compared to the amount of other isomers, and there is, as yet, no successful method known of isomerizing a mixture of dimethylnaphthalene isomers so as to produce only the 2,6-isomer.

In summary then, it has so far not been possible to recover the dimethylnaphthalene isomers in petroleum and convert them to 2,6-dimethylnaphthalene.

Recently, however, a method was found and disclosed (application filed November 17, 1961, Serial No. 69,798, now abandoned) by which a mixture of dimethyldecalin isomers can be isomerized to 2,6-dimethyldecalin. The 2,6-dimethyldecalin can then be dehydrogenated to 2,6-dimethylnaphthalene. This method is more fully described hereinafter.

The present invention provides a method by which all the dimethylnaphthalene isomers in petroleum can be separated as a mixture of the corresponding dimethyldecalin isomers. The dimethyldecalin isomers can then be isomerized and dehydrogenated as described above to 2,6-dimethylnaphthalene. Thus it is now possible, utilizing the present invention, to recover the dimethylnapthalene isomers in petroleum as 2,6-dimethylnaphthalene.

An additional advantage of the present invention is that the dimethyldecalins prepared according to the invention have a high purity, purities of 90% being readily obtainable, with purities of 98–100% being obtained in many cases. This is a highly desirable feature in that the catalyst in the above-mentioned dimethyldecalin isomerization process tends to be deactivated by certain types of impurities. Such deactivation is greatly reduced, however, when the dimethyldecalin starting material is prepared by the method of the present invention.

The present invention will be more fully appreciated after the following discussion of the problems involved in separating dimethylnaphthalene from petroleum fractions containing same.

It is well known that various petrolum stocks contain naphthalene and naphthalene derivatives such as dimethylnaphthalene. Most of the naphthalene compounds present in any given petroleum stock lie in the fraction of the stock boiling between 400° and 550° F. It is, however, extremely difficult to separate the dimethylnaphthalene isomers from this 400–550° F. fraction because a great variety of other compounds, boiling very close to the dimethylnaphthalene isomers, are also present. This is particularly well shown by the data presented in Table I which show the aromatic and saturate content of a typical cracked gas oil prepared by the conventional method of contacting a straight run gas oil (boiling range 400°–600° F.) with a silica-alumina cracking catalyst at a temperature of about 900° F. and a pressure of about 20 p.s.i. The cracked gas oil was distilled in the laboratory into ten volumetrically equal fractions and the boiling range of each fraction noted. Each fraction was then analyzed for saturates and aromatics. Unless otherwise indicated, all percentages in this specification and appended claims are on a weight basis.

TABLE I

| Fraction | Boiling Point Range | Saturates (Wt. Percent of Fraction) | Aromatics (Wt. Percent of Fraction) |
|---|---|---|---|
| 1 | 354–459 | 37.3 | 62.7 |
| 2 | 459–483 | 38.9 | 61.1 |
| 3 | 483–490 | 55.1 | 44.9 |
| 4 | 490–500 | 47.9 | 52.1 |
| 5 | 500–503 | 38.8 | 61.2 |
| 6 | 503–507 | 35.5 | 64.5 |
| 7 | 507–512 | 49.5 | 50.5 |
| 8 | 512–529 | 49.0 | 51.0 |
| 9 | 529–538 | 50.2 | 49.8 |
| 10 | 538+above | 57.8 | 42.2 |

It is apparent from the data in Table I that not one of the ten fractions could be pure dimethylnaphthalene because all fractions contain saturates. Furthermore, even if the saturates are separated from the aromatics by, for example, solvent extraction, pure dimethylnaphthalene would still not be obtained. Dimethylnaphthalene was found in Fractions 3–9 inclusive, yet none of these fractions had an aromatic portion which was pure dimethylnaphthalene. The dimehtylnaphthalene content of the entire aromatic portion of Fractions 3–9 was only about 38%. Furthermore, assuming that saturates had been removed from each fraction, it would still be economically impossible to separate dimethylnaphthalene from the other aromatics associated therewith by distillation. Consider, for example, Fraction 5 in Table I. It would be prohibitively expensive, if not impossible, to construct a commercial distillation unit capable of separating a dimethylnaphthalene isomer boiling at 501° F. from another aromatic boiling at say 502° F. Such efficient separations are not generally realized commercially.

It should be understood that while the data presented in Table I are for a cracked gas oil, other petroleum stocks containing dimethylnaphthalene show similar results; that is, the various dimethylnaphthalene isomers are always present with other saturates or aromatics, or both, boiling very close to the dimethylnaphthalene isomers present. While the amount of saturates or aromatics may vary from one petroleum stock to another, and while the amount of dimethylnaphthalene may vary from one stock to another, the basic problem remains the same.

As mentioned hereinbefore, the present invention provides a method for preparing high purity dimethyldecalin from petroleum stocks containing dimethylnaphthalene. In a specific embodiment of the present invention a catalytically cracked gas oil containing dimethylnaphthalene is distilled to separate a fraction containing dimethylnaphthalene and boiling in the range of 480°–540° F. This 480°–540° F. fraction, which is relatively rich in dimethylnaphthalene, is then hydrogenated to convert at least 92%, preferably 99%, of all the aromatics to saturates. In so doing, substantially all the dimethylnaphthalene isomers are converted to the corresponding dimethyldecalin isomers. The hydrogenated fraction is then distilled to separate a fraction boiling in the range of 400°–450° F. This fraction is high purity dimethyldecalin, typical purities being at least 90%, often 98–100%.

The invention is more specifically described in conjunction with the attached drawing which is a schematic flow-sheet illustrating one manner of practicing the invention.

The starting material is any petroleum fraction containing dimethylnaphthalene. Conventional methods of petroleum refining results in two principal petroleum fractions which contain dimethylnaphthalene. These are catalytically reformed heavy naphtha and catalytically cracked gas oil. Both of these procedures are well known in the prior art but will be described briefly.

Catalytic reforming of heavy naphtha is a conventional method of preparing aromatics for upgrading gasoline octane number and can be effected by contacting a straight run naphtha boiling in the range of 275°–400° F. with a catalyst, at a temperature in the range of 750°–1050° F., a pressure in the range of 200–700 p.s.i., and in the presence of added hydrogen, the molar ratio of hydrogen to hydrocarbon feed being in the range of 2:1 to 5:1. A preferred catalyst is platinum impregnated on an alumina support, the amount of platinum being about 0.1 to 2%. Preferably, the catalyst contains a small amount, e.g., 0.1 to 0.6%, of combined halogen.

The principal reactions occurring in naphtha reforming are isomerization of paraffins to isoparaffins, and dehydrogenation of mono- and dicyclic naphthenes to mono- and dicyclic aromatics.

The heavy naphtha feed to the reformer will generally contain 2 to 20% aromatics, the balance being paraffins, naphthenes, and a small amount of olefins. The reformate contains a fraction boiling below 400° F., usually diverted to gasoline production, and a fraction boiling higher than 400° F., the amount of each fraction depending upon the severity of the reforming conditions, more severe conditions tending to increase the amount of the fraction boiling over 400° F. The portion of the reformate boiling in the range of 400°–550° F. contains any dimethylnaphthalene alone with other aromatics or saturates, or both. The amount of other aromatics, saturates, or both is seldom less than 70% and is usually 80–90%.

Catalytic cracking of gas oil is well known in the prior art, particularly as a means of increasing the yield of gasoline and aromatics from crude oil while decreasing the yield of fuel oil. The principal reaction which occurs is cracking of high boiling compounds into material boiling low enough to be included in gasoline. At the same time, however, some of the compounds present in the gas oil charge stock combine with each other to result in compounds boiling higher than those in the charge stock.

Catalytic cracking of gas oil is effected by contacting a straight run gas oil boiling in the range of 400°–1200° F. with a catalyst at a temperature in the range of 800°–1000° F. and a pressure in the range of 5 to 50 p.s.i.a. Silica-alumina containing 13 to 25% silica is a preferred cracking catalyst but other conventional cracking catalysts such as silica-magnesia, montmorillonite clay, kaolinite clay, and mixtures thereof, can also be used.

The composition of the cracked gas oil will depend upon several factors including the type of crude oil, the boiling range of the straight run gas oil, severity of cracking compositions, and the like. A cracked gas oil usually has a considerable portion boiling below 400° F., and this fraction is generally used in gasoline production. The fraction of the cracked gas oil boiling in the range of 400° to 550° F. contains any dimethylnaphthalene and generally will have an analysis as follows:

Saturates—20–90% total: Percent
   (a) Paraffins and isoparaffins _____ 10–45
   (b) Mono- and dicyclic naphthenes _____ 5–50
   (c) Higher cyclic naphthenes _____ 0–20
Aromatics—10–70% total:
   (a) Dicyclic aromatics _____ 5–50
   (b) Mono-, tri-, and higher cyclic aromatics_ 5–50

The dimethylnaphthalene content of the 400° to 550° F. fraction is usually 5–15% and is seldom higher than 30%.

The starting material containing dimethylnaphthalene passes along line 1 and enters distillation zone 2. Distillation zone 2 is operated in such a manner as to remove through line 3 a fraction containing dimethylnaphthalene and boiling in the range of 480° to 540° F. This 480°–540° F. fraction is relatively rich in dimethylnaphthalene, typical purities of this fraction being 20–25%, but it still contains a considerable amount of saturates or other aromatics, or both. Material boiling below 480° F., containing mostly monocyclic aromatics and saturated compounds, is taken off through overhead line 4. Material boiling above 540° F. is removed as bottoms through line 5.

The fraction boiling in the range of 480° to 540° F. continues alone line 3 and enters hydrogenator 6. In some cases it will be desirable to desulfurize the 480°–540° F. fraction before it enters the hydrogenator in order to reduce poisoning of the hydrogenation catalyst. In the case of a naphtha reformate starting material this is usually not necessary since the heavy naphtha will usually have been desulfurized prior to reforming in order to avoid poisoning of the reforming catalyst. Where, however, the starting material contains a substantial amount of sulfur, such as a catalytic gas oil, desulfurization is desirable and can be effected by any conventional method such as by contact with hydrogen at a temperature of 500°–1000° F. in the presence of a cobalt-molybdenum catalyst, the liquid hourly space velocity being 0.5–5, and the hydrogen rate being 2000–10,000 s.c.f. per barrel.

Hydrogenator 6 contains a hydrogenation catalyst not shown which is preferably platinum or nickel supported on a suitable carrier such as alumina. Hydrogen enters hydrogenator 6 through line 7. Hydrogenator 6 should be operated at a temperature in the range of 400° to 1000° F. and a pressure in the range of 500 to 4000 p.s.i.a. The ratio of hydrogen to hydrocarbon feed should be in the range of 5000 to 15,000 s.c.f. hydrogen per barrel of hydrocarbon feed. The liquid hourly space velocity in hydrogenator 6 should be in the range of 0.1 to 10.0.

It is essential to the preparation of high purity dimethyldecalin that the hydrogenation products contain less than 8%, preferably less than 1%, aromatics. In order to effect this substantially complete hydrogenation, alternative routes are available. Several hydrogenators can be operated in series with relatively mild hydrogenation conditions in each. Alternatively, one hydrogenator operating under relatively severe conditions can be used. As another alternative, a single hydrogenator can be used in conjunction with relatively mild hydrogenation conditions and the hydrogenation products recycled to the hydrogenator until substantially complete hydrogenation is obtained.

The products from the hydrogenation step pass alone line 8 to condensing and separating means, indicated at 9, from which hydrogen is recycled through line 10.

The liquid product from the separator passes alone line 11 to distillation zone 12 which is operated in such a manner as to remove through line 13 a fraction boiling in the range of 400° to 450° F. This fraction is high purity dimethyldecalin, typical purities being 90–100%, often 98–100%. Material boiling lower than 400° F. is removed as overhead through line 14 and may, if desired, be diverted to gasoline production. Material boiling higher than 450° F. is removed as bottoms through line 15. This bottoms material is suitable for a cracking charge stock.

The function of each step in the process as described should be noted. The purpose of the initial distillation is to separate from the starting material those aromatic and saturate impurities which would otherwise not be separated in the subsequent steps of the process and which would therefore contaminate the final dimethyldecalin product. For example, if the boiling range of the initially separated fraction is broadened to 460°–550° F., the purity of the final dimethyldecalin product is substantially less than when the boiling range is 480°–540° F. as specified. It is thus apparent, and surprising, that while the aromatic and saturate impurities in the 480–540° F. fraction will be separated in subsequent steps from the dimethylnaphthalene, the impurities boiling above and below this range cannot be so separated and therefore have to be rejected by an initial distillation.

The initial distillation in zone 2 produces a fraction enriched in dimethylnaphthalene. Typical purities of the 480°–540° F. fraction are 20–50% dimethylnaphthalene but this is about as high as can be obtained by distillation for the reasons mentioned in the discussion of Table I.

The hydrogenation step is not merely for the purpose of converting the dimethylnaphthalene to dimethyldecalin. The hydrogenation step also accomplishes a spreading of boiling points. The feed to the hydrogenator contains about 20 to 50% dimethylnaphthalene and has a relatively narrow boiling range of 60° F. or less. While the hydrogenation products contain typically only 20 to 50% dimethyldecalin, the hydrogenation products do have a sufficiently wide boiling range that a single material, dimethyldecalin, can thereafter be isolated in high purity by simple distillation.

The purpose in hydrogenating to less than 8% aromatics is to reduce contamination of the hydrogenation products with compounds which either themselves boil in the same boiling range as the various dimethyldecalin isomers (400°–450° F.), or which will form azeotropes boiling in the same range as the various dimethyldecalin isomers. In order to recover dimethyldecalins of at least 90% purity, it has been found that the aromatics content of the hydrogenation products should be less than 8%.

While hydrogenation to an aromatics content of less than 8% will allow recovery of dimethyldecalins of at least 90% purity, it will often be desirable for several reasons to hydrogenate to an even lower aromatics content, i.e., 1% or less. One reason is that in many cases more complete hydrogenation effects further improvement in the purity of the dimethyldecalins subsequently recovered. This is especially true in the case of a naphtha reformate starting material. In such a case, while hydrogenation to an aromatics content of about 7–8% results in a dimethyldecalin purity of, say 90–95%, hydrogenation to less than 1% aromatics often results in purities of 98–100%. The second reason for the desirability of more complete hydrogenation, i.e., 1% or less aromatics, concerns the character of any impurities in the dimethyldecalins subsequently recovered. As will be seen hereinafter, the dimethyldecalin isomerization catalyst is deactivated by aromatics. It is not, however, deactivated by saturates. Consequently, aromatic impurities in the dimethyldecalin starting material are considerably more deleterious than saturate impurities. In the process of the present invention, therefore, hydrogenation to less than 1% aromatics is desirable independent of the improvement in dimethyldecalin purity thereby obtained.

The high purity dimethyldecalins recovered from distillation zone 12 can be used for any desired purpose such as, for example, a starting material for a dimethyldecalin isomerization process. Following isomerization, 2,6-dimethyldecalin is separated and can then be dehydrogenated to 2,6-dimethylnaphthalene.

The copending application mentioned hereinbefore discloses the isomerization of a mixture of dimethyldecalin isomers to an equilibrium mixture of dimethyldecalins in which 2,6-dimethyldecalin occurs in relatively high proportion. The isomerization is effected by contacting the mixture of dimethyldecalin isomers with an AlBr$_3$-HBr catalyst at a temperature in the range of 65° to 140° F. The AlBr$_3$ is dissolved in the mixture of dimethyldecalins and should be 20–200% by weight based on the mixture of dimethyldecalins. Sufficient HBr should be pressured into the reactor to provide a partial pressure of 25–100 p.s.i.a. After an interval of 20–240 minutes, the isomerization reaches equilibrium. Upon diluting the equilibrium mixture with a solvent such as n-pentane and cooling to, say −115° F., the 2,6-isomer precipitates and can be separated from the remaining isomers in any suitable manner, after which the remaining isomers can be re-equilibrated to yield more of the 2,6-isomer.

In the above-described isomerization process it is highly desirable in at least two respects to have a substantially pure dimethyldecalin starting material. Any impurities present in the starting material will build up in the isomerization process and eventually render the process inoperable unless they are purged. Any purge, however, will also result in a direct loss of dimethyldecalin. The present invention greatly reduces the need for such purge streams since the dimethyldecalin starting material prepared according to the method of the present invention is of high purity.

In addition, any aromatics present in the feed material to the isomerization process deactivate the isomerization catalyst through the formation of an aromatic-aluminum bromide complex. For example,

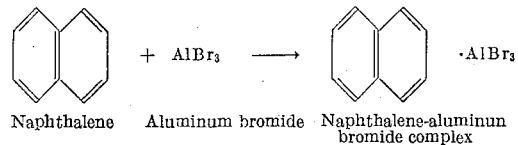

Naphthalene    Aluminum bromide    Naphthalene-aluminum bromide complex

The aromatic-aluminum bromide complex is an ineffective dimethyldecalin isomerization catalyst. Thus the amount of catalyst consumed is directly proportional to the aromatic impurities in the feed material.

The 2,6-dimethyldecalin can be converted to 2,6-dimethylnaphthalene by passing the 2,6-dimethyldecalin over a conventional dehydrogenation catalyst at a temperature in the range of 700° to 850° F., more preferably 750° to 800° F. A platinum catalyst is preferred for this purpose, such as platinum distended on alumina or activated carbon.

*Example I*

A gas oil having an initial boiling point of 400° F. and an end boiling point of 950° F. was obtained by distillation of a Texas crude oil. This gas oil was cracked over a silica-alumina cracking catalyst at a temperature of 950° F. and at atmospheric pressure. The 400°–550° F. fraction of the cracked gas oil contained 50% aromatics, 50% saturates, and had a dimethylnaphthalene content of 10.6%. This 400°–550° F. fraction was distilled to separate a fraction having an initial boiling point of 480° F. and an end boiling point of 540° F. This 480°–540° F. fraction had an aromatics content of 51.2%, a saturate content of 48.8%, and a dimethylnaphthalene content of 24.8%. The 480°–540° F. fraction was desulfurized by treating with hydrogen in the presence of a cobalt-molybdenum catalyst. The desulfurized 480°–540° F. fraction was then hydrogenated over a platinum on alumina hydrogenation catalyst at a temperature of 650° F., a pressure of 1200 p.s.i., a hydrogen rate of 8000 s.c.f. per barrel and a liquid hourly space velocity of .75 volume of oil per volume of catalyst per hour. The hydrogenated 480°–540° F. fraction had an aromatics content of 0.6% and a dimethyldecalin content of 23%. This hydrogenated 480°–540° F. fraction was distilled to separate a fraction having an initial boiling point of 400° F. and an end boiling point of 450° F. This 400°–450° F. fraction analyzed, by gas chromatography, 90% dimethyldecalin. The 10% impurities analyzed essentially 100% saturates.

*Example II*

The procedure was the same as in Example I except that the space velocity in the hydrogenation step was increased such that the hydrogenated 480°–540° F. fraction had an aromatics content of 7%. The dimethyldecalin content of the final 400°–450° F. fraction was 90% but the 10% impurities now analyzed 40% saturates and 60% aromatics.

When naphtha reformates are treated according to the invention, the results are equal to or superior to those obtained with cracked gas oils. In many cases the purity of the dimethyldecalins recovered from a naphtha reformate starting material is 98–100%.

We claim:
1. Method of preparing dimethyldecalin comprising the steps of
    A. distilling a petroleum fraction boiling mainly in the range of 400 to 550° F. and containing less than 30% dimethylnaphthalene to separate a fraction containing dimethylnaphthalene and boiling in the range of 480 to 540° F.,
    B. catalytically hydrogenating the 480 to 540° F. fraction of A to an aromatics content of less than 8% under hydrogenation conditions comprising a temperature in the range of 400 to 1000° F., a pressure in the range of 500 to 4000 p.s.i., a liquid hourly space velocity in the range of 0.1 to 10.0, and in the presence of 5000 to 15,000 standard cubic feet of hydrogen per barrel of hydrocarbon feed, whereby a hydrogenated fraction is obtained, and,
    C. distilling the hydrogenated fraction of B to separate a fraction containing at least 90% dimethyldecalin and boiling in the range of 400 to 450° F.
2. Method of claim 1 in which the petroleum fraction is a catalytically reformed heavy naphtha.
3. Method of claim 1 in which the petroleum fraction is a catalytically cracked gas oil.
4. Method of claim 1 in which the hydrogenation of B is to an aromatics content of less than 1%.
5. Method of preparing dimethyldecalin comprising the steps of
    A. distilling a petroleum fraction (1) to separate a fraction (2) containing dimethylnaphthalene and boiling in the range of 480 to 540° F., said petroleum fraction (1) containing dimethylnaphthalene in an amount less than 30% by weight of the portion of said petroleum fraction (1) which boils between 400 and 550° F.,
    B. catalytically hydrogenating the fraction (2) of A to an aromatics content of less than 8% under hydrogenation conditions comprising a temperature in the range of 400 to 1000° F., a pressure in the range of 500 to 4000 p.s.i., a liquid hourly space velocity in the range of 0.1 to 10.0, and in the presence of 5000 to 15,000 standard cubic feet of hydrogen per barrel of hydrocarbon feed, whereby a hydrogenated fraction is obtained, and
    C. distilling the hydrogenation fraction of B to separate a fraction containing at least 90% dimethyldecalin and boiling in the range of 400 to 450° F.
6. Method of claim 5 in which the petroleum fraction is a catalytically reformed heavy naphtha.
7. Method of claim 5 in which the petroleum fraction is a catalytically cracked gas oil.
8. Method of claim 5 in which the hydrogenation of B is to an aromatics content of less than 1%.
9. Method of preparing dimethyldecalin comprising catalytically hydrogenating a petroleum fraction boiling in the range of 480 to 540° F. and containing dimethylnaphthalene, and distilling the hydrogenated 480 to 540° F. fraction to separate a fraction boiling in the range of 400 to 450° F. and containing dimethyldecalin in a purity of at least 90%.
10. Method of claim 9 in which the catalytic hydrogenation is carried out in the presence of 5000 to 15,000 standard cubic feet of hydrogen per barrel of hydrocarbon feed, at a temperature in the range of 400 to 1000° F., a pressure in the range of 500 to 4000 p.s.i., and a liquid hourly space velocity in the range of 0.1 to 10.0.

References Cited by the Examiner

UNITED STATES PATENTS

| | | | |
|---|---|---|---|
| 2,382,446 | 8/1945 | Ross et al. | 260—666 |
| 2,415,065 | 1/1947 | Ross et al. | 260—666 |
| 2,443,079 | 6/1948 | Otto | 260—667 |
| 2,562,926 | 8/1951 | Legatski | 260—666 |
| 3,091,649 | 5/1963 | Schneider | 260—667 |
| 3,103,540 | 9/1963 | Schneider | 260—666 |

DANIEL E. WYMAN, *Primary Examiner.*

P. P. GARVIN, *Examiner.*